(12) United States Patent
Chimura et al.

(10) Patent No.: US 10,709,143 B2
(45) Date of Patent: Jul. 14, 2020

(54) CLAMPING DEVICE FOR BONE-IN LIMB MEAT, LOADING DEVICE FOR BONE-IN LIMB MEAT, AND CLAMPING METHOD FOR BONE-IN LIMB MEAT

(71) Applicant: MAYEKAWA MFG. CO., LTD., Tokyo (JP)

(72) Inventors: Takeshi Chimura, Tokyo (JP); Hiroyuki Usui, Tokyo (JP); Takekuni Umehara, Tokyo (JP); Osamu Goto, Tokyo (JP); Yuuichi Kuratani, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 16/463,132

(22) PCT Filed: Oct. 5, 2018

(86) PCT No.: PCT/JP2018/037391
§ 371 (c)(1),
(2) Date: May 22, 2019

(87) PCT Pub. No.: WO2019/070060
PCT Pub. Date: Apr. 11, 2019

(65) Prior Publication Data
US 2020/0060297 A1    Feb. 27, 2020

(30) Foreign Application Priority Data
Oct. 6, 2017   (JP) ................. 2017-195874

(51) Int. Cl.
*A22C 17/00* (2006.01)
*A22B 7/00* (2006.01)
(Continued)

(52) U.S. Cl.
CPC .......... *A22C 17/0093* (2013.01); *A22B 7/005* (2013.01); *A22C 15/00* (2013.01); *A22C 21/0053* (2013.01)

(58) Field of Classification Search
CPC .......... A22B 7/001; A22B 7/002; A22B 7/003; A22B 5/00; A22B 5/16; A22C 17/00; A22C 17/0093
(Continued)

(56) References Cited

U.S. PATENT DOCUMENTS

| 3,376,600 A | 4/1968 | Shadley |
| 6,277,021 B1 * | 8/2001 | Meyn ................. A22C 21/0007 452/182 |

(Continued)

FOREIGN PATENT DOCUMENTS

| EP | 2174551 A1 | 4/2010 |
| EP | 2277382 A1 | 1/2011 |

(Continued)

OTHER PUBLICATIONS

Notice of Allowance issued in U.S. Appl. No. 16/463,108 dated Jan. 9, 2020.
(Continued)

*Primary Examiner* — Richard T Price, Jr.
(74) *Attorney, Agent, or Firm* — Rossi, Kimms & McDowell LLP

(57) ABSTRACT

A clamping device for a bone-in limb meat according to an embodiment includes a pair of clamp pieces including a first clamp piece and a second clamp piece, and being openable/closable so as to hold a bone-in limb meat, and rotation suppressing portions for suppressing a rotation of the bone-in limb meat, the rotation suppressing portions being disposed at positions deviated with respect to the pair of clamp pieces in a direction perpendicular to a plane including an (Continued)

opening/closing direction of the pair of clamp pieces. The rotation suppressing portions include a projection portion disposed so as to protrude from the first clamp piece into a space between the pair of clamp pieces and configured to contact the bone-in limb meat when viewed from the direction perpendicular to the plane.

15 Claims, 8 Drawing Sheets

(51) Int. Cl.
  *A22C 15/00* (2006.01)
  *A22C 21/00* (2006.01)
(58) Field of Classification Search
  USPC ....... 452/125, 128, 149, 150, 153, 177, 183, 452/184
  See application file for complete search history.

(56) References Cited

U.S. PATENT DOCUMENTS

| | | | |
|---|---|---|---|
| 6,779,647 B1 | 8/2004 | Nagler | |
| 7,404,759 B2 | 7/2008 | Sato | |
| 9,004,988 B2* | 4/2015 | Van Der Steen | A22B 7/002 452/125 |
| 9,179,684 B2 | 11/2015 | Van Stuyvenberg | |
| 9,451,779 B2 | 9/2016 | Hattori et al. | |
| 2009/0238670 A1 | 9/2009 | Helgi | |
| 2012/0231715 A1 | 9/2012 | Kodama et al. | |
| 2012/0315834 A1* | 12/2012 | Van Der Steen | A22B 5/007 452/125 |
| 2013/0029574 A1* | 1/2013 | Van Der Steen | A22B 7/003 452/125 |
| 2015/0004892 A1* | 1/2015 | Taniguchi | A22C 17/004 452/136 |
| 2016/0037787 A1* | 2/2016 | Van Der Steen | A22B 7/002 452/179 |
| 2019/0373904 A1* | 12/2019 | Chimura | A22B 7/003 |

FOREIGN PATENT DOCUMENTS

| | | |
|---|---|---|
| GB | 2415944 A | 1/2006 |
| JP | 2001149001 A | 6/2001 |
| JP | 2005304314 A | 11/2005 |
| JP | 2013507101 A | 3/2013 |
| WO | 2007138616 A2 | 12/2007 |
| WO | 2008136513 A1 | 11/2008 |
| WO | 2009139031 A1 | 11/2009 |
| WO | 2014064773 A1 | 5/2014 |

OTHER PUBLICATIONS

Extended European Search Report issued in European Appln. No. 18864870.3 dated Jan. 24, 2020.
International Search Report issued in Intl. Appln No. PCT/JP2018/037378 dated Nov. 13, 2018. English translation provided.
Written Opinion issued in Intl. Appln. No. PCT/JP2018/037378 dated Nov. 13, 2018.
International Search Report issued in Intl. Appln PCT/JP2018/037388 dated Nov. 13, 2018. English translation provided.
Written Opinion issued in Intl. Appln. No. PCT/JP2018/037388 dated Nov. 13, 2018.
International Search Report issued in Intl. Appln. No. PCT/JP2018/037391 dated Nov. 13, 2018. English translation provided.
Written Opinion issued in Intl. Appln. No. PCT/JP2018/037391 dated Nov. 13, 2018.
Copending U.S. Appl. No. 16/463,082, filed May 22, 2019 (a copy is not included because the cited application is not yet available to the public and the Examiner has ready access to the cited application).
Copending U.S. Appl. No. 16/463,098, filed May 22, 2019 (a copy is not included because the cited application is not yet available to the public and the Examiner has ready access to the cited application).
Copending U.S. Appl. No. 16/463,108, filed May 22, 2019 (a copy is not included because the cited application is not yet available to the public and the Examiner has ready access to the cited application).
Notice of Allowance issued in U.S. Appl. No. 16/463,098 dated Mar. 24 2020.

* cited by examiner

CLAMPING DEVICE FOR BONE-IN LIMB MEAT, LOADING DEVICE FOR BONE-IN LIMB MEAT, AND CLAMPING METHOD FOR BONE-IN LIMB MEAT

TECHNICAL FIELD

This disclosure relates to a clamping device for a bone-in limb meat, a loading device for the bone-in limb meat, and a clamping method for the bone-in limb meat.

BACKGROUND

In order to save labor, a process of slaughtering an edible chicken carcass undergoes transition from manual processing to automatic processing by a machine.

Patent Document 1 discloses an automatic deboner which performs a process of deboning a bone-in thigh meat of a carcass. This deboner intermittently conveys the bone-in thigh meat between a plurality of processing stations while suspending it with a clamping device, and sequentially performs steps of cutting a meat of the bone-in thigh meat, separating bone and meat, and the like in the respective stations, to enable automatic deboning.

Patent Document 2 discloses a clamping device which holds a bone-in thigh meat conveyed by a conveyor by a multi-axes articulated arm and suspends it to a hanger.

CITATION LIST

Patent Literature

Patent Document 1: JP2013-507101 (translation of a PCT application)
Patent Document 2: WO2009/139031A

SUMMARY

Technical Problem

When loading bone-in limb meats such as bone-in thigh meats to a deboner, it is necessary to load a plurality of bone-in limb meats in the same direction so that a processing step for the plurality of bone-in limb meats can be performed uniformly. At present, however, it is difficult to automate this work by a machine, so it is necessary for person to support to do this work.

Neither Patent Document 1 nor Patent Document 2 discloses a means for automating a work to load a plurality of bone-in limb meats to a deboner or the like in the same direction.

An object of one embodiment is to automate, by a machine without manpower, a work to load a plurality of bone-in limb meats in the same direction when loading the bone-in limb meats to a processing portion such as a deboner.

Solution to Problem (1) A clamping device for a bone-in limb meat according to an embodiment includes
a pair of clamp pieces including a first clamp piece and a second clamp piece, and being openable/closable so as to hold a bone-in limb meat, and rotation suppressing portions for suppressing a rotation of the bone-in limb meat, the rotation suppressing portions being disposed at positions deviated with respect to the pair of clamp pieces in a direction perpendicular to a plane including an opening/closing direction of the pair of clamp pieces. The rotation suppressing portions include a projection portion disposed so as to protrude from the first clamp piece into a space between the pair of clamp pieces and configured to contact the bone-in limb meat when viewed from the direction perpendicular to the plane.

With the above configuration (1), when the above pair of clamp pieces perform a closing operation in order to hold the bone-in limb meat, the above projection portion protrudes toward the bone-in limb meat and digs into the bone-in limb meat, making it possible to fix the bone-in limb meat so as to resist movement thereof. The projection portion is disposed at the position deviated with respect to the pair of clamp pieces in the direction perpendicular to the plane including the opening/closing direction of the pair of clamp pieces, and fixes the bone-in limb meat in cooperation with the pair of clamp pieces, making it possible to stably fix the bone-in limb meat.

It is possible to load the bone-in limb meat to a processing portion such as a deboner in a desired direction by changing the pair of clamp pieces to be at desired positions and orientations while holding the bone-in limb meat. It is therefore possible to load the plurality of bone-in limb meats to the processing portion in the same direction by sequentially holding the plurality of bone-in limb meats by the clamping device.

(2) In an embodiment, in the above configuration (1), the rotation suppressing portions further include an abutting portion disposed on a side of the second clamp piece across a center line between the pair of clamp pieces in back of the pair of clamp pieces with respect to the projection portion and configured to contact the bone-in limb meat, and the abutting portion extends oblique to a direction perpendicular to the center line between the pair of clamp pieces so as to head for the back of the pair of clamp pieces as the abutting portion approaches the first clamp piece.

With the above configuration (2), when the pair of clamp pieces perform the closing operation in order to hold the bone-in limb meat, the abutting portion having the above configuration presses the bone-in limb meat. Therefore, when the pair of clamp pieces perform the closing operation, the above projection portion digs into the bone-in limb meat from the side of the first clamp piece, and this abutting portion presses the bone-in limb meat from the side of the second clamp piece, making it possible to fix the bone-in limb meat more stably.

(3) In an embodiment, in the above configuration (1) or (2), the projection portion is formed by a plate-shape body extending along a direction intersecting with the plane.

With the above configuration (3), it is possible to increase a holding force of the projection portion for the bone-in limb meat by forming the projection portion by the plate-shape body.

Further, if the bone-in limb meat is a bone-in thigh meat of poultry or the like, the bone-in thigh meat has a depression in a limb neck part along a longitudinal direction. Therefore, if the projection portion is the plate-shape body having the above configuration, the plate-shape body can be inserted into the depression along an extending direction of the depression, making it possible to increase the holding force for the bone-in limb meat.

(4) In an embodiment, in the above configuration (2), the abutting portion is formed by a plate-shape body extending along a direction intersecting with the plane.

With the above configuration (4), if the abutting portion is the plate-shape body having the above configuration, it is possible to increase an area in contact with the bone-in limb meat, making it possible to increase the holding force of the abutting portion for the bone-in limb meat.

(5) In an embodiment, in the above configuration (2) or (4), the rotation suppressing portions include a first support wall extending along the direction intersecting with the plane and including the projection portion fixed thereto and a second support wall extending along the direction intersecting with the plane and including the abutting portion fixed thereto, and the first support wall and the second support wall each extend in a direction in which intervals between the first support wall and the second support wall are widened toward an upper side in a suspension direction of the bone-in limb meat.

With the above configuration (5), the rotation suppressing portions include the first support wall and the second support wall, making it possible to increase support strengths of the projection portion and abutting portion, and to stably fix the bone-in limb meat.

In addition, because the first support wall and the second support wall each extend in the direction in which intervals between the first support wall and the second support wall are widened toward the upper side in the suspension direction of the bone-in limb meat, it becomes easier to accommodate, between the first support wall and the second support wall, an enlarged diameter part located immediately above a held section of the bone-in limb meat and locked to the pair of clamp pieces, making it possible to stably suspend the bone-in limb meat by the pair of clamp pieces.

(6) In an embodiment, in the above configuration (5), the first support wall and the second support wall have U-shapes each having both ends bent in a direction to face each other when viewed from the direction perpendicular to the plane.

With the above configuration (6), the first support wall and the second support wall have the U-shapes, making it possible to improve the strengths of the first support wall and second support wall.

(7) In an embodiment, in the above configuration (5) or (6), the first support wall is integral with the first clamp piece and disposed at a position deviated with respect to the first clamp piece in the direction perpendicular to the plane, and the second support wall is integral with the second clamp piece and disposed at a position deviated with respect to the second clamp piece in the direction perpendicular to the plane.

With the above configuration (7), it is possible to dispose the projection portion fixed to the first support wall at a position where the projection portion can fix the bone-in limb meat in cooperation with the first clamp piece and to dispose the abutting portion fixed to the second support wall at a position where the abutting portion can fix the bone-in limb meat in cooperation with the second clamp piece. Thus it is possible to stably fix the bone-in limb meat.

(8) In an embodiment, in any one of the above configurations (1) to (7), the clamping device for the bone-in limb meat further includes a base portion to which the pair of clamp pieces and the rotation suppressing portions are attachable, and the pair of clamp pieces and the rotation suppressing portions are attachable to the base portion so as to be invertible about the center line between the pair of clamp pieces.

With the above configuration (8), the first clamp piece and the second clamp piece, and the projection portion and the abutting portion after inversion can switch original positions with each other.

When holding the bone-in limb meat by the clamping device, the bone-in limb meat is placed on a conveyance surface or the like of, for example, a conveyor. For the sake of convenience, a surface on which the bone-in limb meat is placed at this time will also be referred to as a "holding surface" in the present description. When the bone-in limb meat is a bone-in thigh meat of poultry or the like, the bone-in thigh meat is placed on the holding surface in a state in which an upper surface of the bone-in thigh meat is a front surface (inner thigh surface) or a back surface (outer thigh surface).

When the upper surface of the bone-in thigh meat is the front surface or the back surface on the holding surface, the position of the depression in the limb neck part is reversed. With the above configuration (8), however, even if the depression is at the reverse position, it is possible to touch the depression with the projection portion by inverting the pair of clamp pieces and the rotation suppressing portions.

(9) A loading device for a bone-in limb meat for loading the bone-in limb meat to a processing portion, the loading device includes the clamping device for the bone-in limb meat according to any one of the above configurations (1) to (8) and an arm supporting the pair of clamp pieces, and capable of controlling positions and orientations of the pair of clamp pieces, and the bone-in limb meat held by the clamping device is loaded to the processing portion.

With the above configuration (9), with the clamping device having the above configuration, it is possible to fix the bone-in limb meat so as to resist movement thereof It is possible to load the bone-in limb meat to the processing portion such as the deboner in a desired direction by changing the pair of clamp pieces to be at desired positions and orientations by the above arm while holding the bone-in limb meat by the clamping device. It is therefore possible to load the plurality of bone-in limb meats to the processing portion in the same direction by sequentially holding the plurality of bone-in limb meats by the clamping device.

(10) In an embodiment, in the above configuration (9), the loading device for the bone-in limb meat further includes a conveyor conveying the bone-in limb meat to the processing portion, a determination portion capable of acquiring orientation information of the bone-in limb meat conveyed by the conveyor, and a control portion operating the arm based on the orientation information obtained by the determination portion and loading the bone-in limb meat to the processing portion in a predetermined direction.

With the above configuration (10), the above control portion operates the arm based on the orientation information obtained by the above determination portion, making it possible to hold the bone-in limb meat placed and sent on the conveyor at an arbitrary position and orientation, and load the bone-in limb meat held by the clamping device to the processing portion in the predetermined direction.

It is therefore possible to load the plurality of bone-in limb meats to the processing portion in the same direction by sequentially holding the plurality of bone-in limb meats by the clamping device.

(11) In an embodiment, in the above configuration (10), the orientation information includes front/back surface information indicating whether an upper surface of the bone-in limb meat placed on the conveyor is a front surface or a back surface, and the control portion is configured to control an operation of the arm based on the orientation information and the front/back surface information, and load the bone-in limb meat to the processing portion so that one of the front surface or the back surface always faces a same direction with respect to the processing portion.

With the above configuration (11), in a case in which the bone-in limb meat has the front surface or the back surface like a bone-in thigh meat, the control portion controls the operation of the arm based on the orientation information and the front/back surface information, making it possible to load the bone-in limb meat to the processing portion such as the deboner so that the front surface or the back surface always faces the same direction with respect to the processing portion when loading the bone-in limb meat to the processing portion such as the deboner.

(12) In an embodiment, in the above configuration (11), the processing portion includes a plurality of hangers each being capable of suspending the bone-in limb meat, and the control portion is configured to control the operation of the arm based on the orientation information and the front/back surface information, and suspend the plurality of bone-in limb meats to the plurality of hangers respectively so that one of front surfaces or back surfaces always face a same direction.

With the above configuration (12), when suspending the bone-in limb meats to the plurality of hangers disposed in the processing portion, the plurality of bone-in limb meats are suspended to the plurality of hangers so that one of the front surfaces or the back surfaces always face the same direction by causing the control portion to control the operation of the arm based the orientation information and the front/back surface information. In this way, it is possible to load the plurality of bone-in limb meats in a state in which one of the front surfaces or the back surfaces always face the same direction.

(13) A clamping method for holding a bone-in limb meat by using a clamping device which includes a pair of clamp pieces including a first clamp piece and a second clamp piece, and being openable/closable so as to hold the bone-in limb meat, and rotation suppressing portions for suppressing a rotation of the bone-in limb meat, the rotation suppressing portions being disposed at positions deviated with respect to the pair of clamp pieces in a direction perpendicular to a plane including an opening/closing direction of the pair of clamp pieces, the rotation suppressing portions including a projection portion disposed so as to protrude from the first clamp piece into a space between the pair of clamp pieces and configured to contact the bone-in limb meat when viewed from the direction perpendicular to the plane, the clamping method according to an embodiment includes a holding step of holding the bone-in limb meat by closing the pair of clamp pieces and a fixing step of fixing the bone-in limb meat to the pair of clamp pieces by inserting the projection portion into a depression of the bone-in limb meat.

With the above method (13), in the above holding step, when the pair of clamp pieces perform the closing operation while nipping the bone-in limb meat, the projection portion protrudes toward the bone-in limb meat and digs into the bone-in limb meat, making it possible to fix the bone-in limb meat so as to resist movement thereof. The projection portion is disposed at the position deviated with respect to the pair of clamp pieces in the direction perpendicular to the plane including the opening/closing direction of the pair of clamp pieces, and thus fixes the bone-in limb meat in cooperation with the pair of clamp pieces, making it possible to stably fix the bone-in limb meat.

It is possible to load the bone-in limb meat to the processing portion such as the deboner in a desired direction by changing the pair of clamp pieces to be at desired positions and orientations in this state. It is therefore possible to load the plurality of bone-in limb meats to the processing portion in the same direction by sequentially holding the plurality of bone-in limb meats by the clamping device.

(14) In an embodiment, in the above method (13), the clamping method for the bone-in limb meat further includes a determining step of determining whether a surface of the bone-in limb meat placed on a conveyor is a front surface or a back surface, the bone-in limb meat being conveyed to the processing portion by the conveyor and an adjusting step of adjusting, based on determination information obtained in the determining step, a position of the projection portion with respect to the bone-in limb meat so that the projection portion is always inserted into the depression.

With the above method (14), based on the determination information obtained in the above determining step, the projection portion is always inserted into the depression in the above adjusting step, making it possible to stably fix the bone-in limb meat by the clamping device.

(15) In an embodiment, in the above method (13) or (14), the bone-in limb meat is a bone-in thigh meat, and a limb neck part of the bone-in thigh meat is held by the pair of clamp pieces.

With the above method (15), if the bone-in limb meat is the bone-in thigh meat of poultry or the like, the projection portion is always inserted into the depression by holding the limb neck part by the pair of clamp pieces, making it possible to stably fix the bone-in thigh meat and load a plurality of bone-in thigh meats to a processing portion in the same direction.

Advantageous Effects

According to an embodiment, it is possible to load a plurality of bone-in limb meats in the same direction without manpower when loading bone-in limb meats to a processing portion such as a deboner.

DETAILED DESCRIPTION

Figure 1:
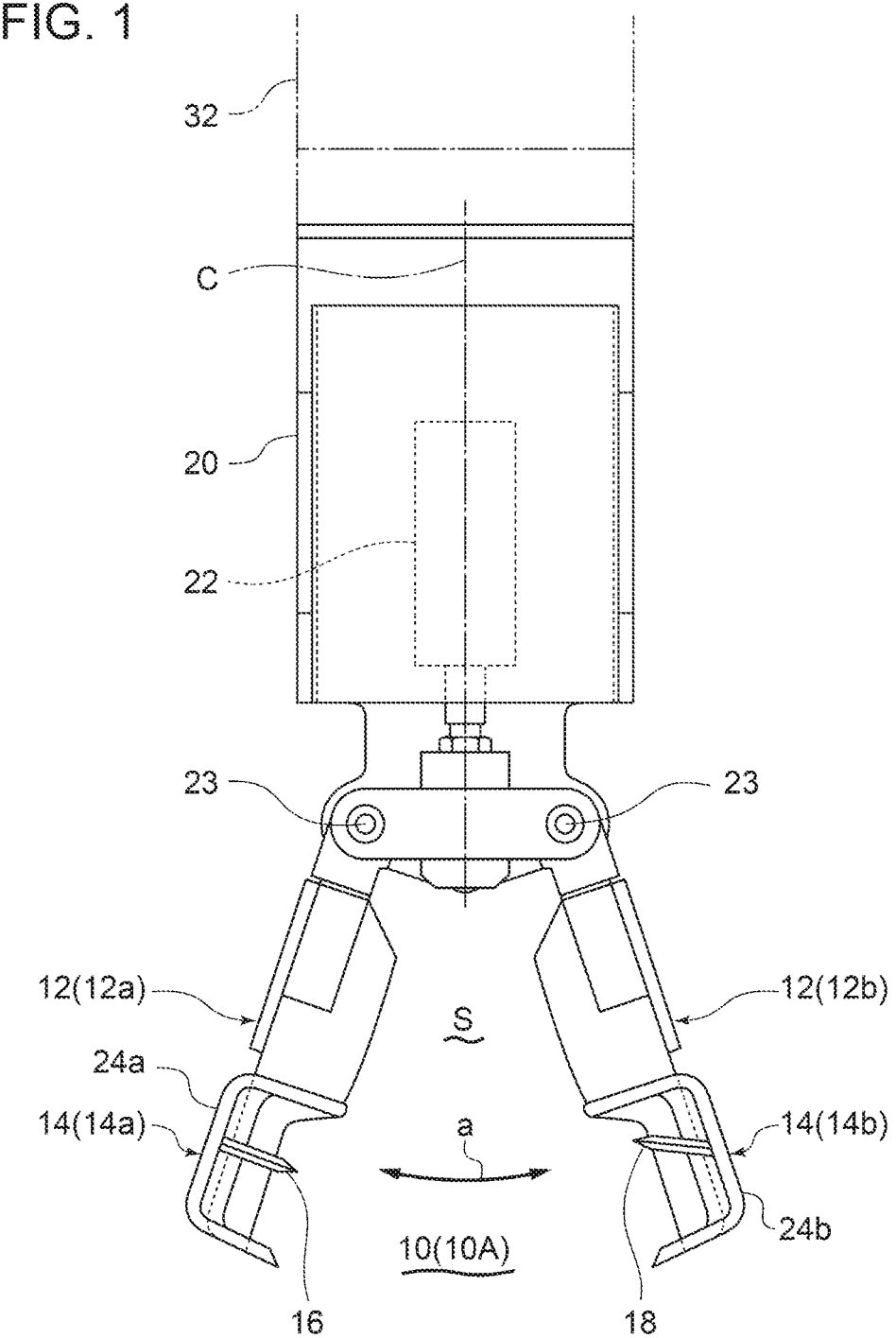
FIG. 1 is a planar view of a clamping device according to an embodiment.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIGS. 1 to 4 show clamping device 10 (10A or 10B) for a bone-in limb meat according to some embodiments.

In FIGS. 1 to 4, the clamping device 10 includes a pair of clamp pieces 12 and rotation suppressing portions 14. The pair of clamp pieces 12 include a first clamp piece 12 (12a) and a second clamp piece 12 (12b) which are openable/closable so as to hold a bone-in limb meat W. The rotation suppressing portions 14 are disposed at positions deviated with respect to the pair of clamp pieces 12 in a direction perpendicular to a plane P (see FIG. 2) including an opening/closing direction (the direction of an arrow "a") of the pair of clamp pieces 12 and suppress a rotation of the bone-in limb meat W.

The rotation suppressing portion 14 includes a projection portion 16. When viewed from the direction perpendicular to the plane P (that is, a direction illustrated in FIGS. 1 and 3), the projection portion 16 is disposed so as to protrude from the first clamp piece 12 (12a) into a space S between the pair of clamp pieces 12 and configured to contact the bone-in limb meat W when the pair of clamp pieces 12 hold the bone-in limb meat W.

According to the above configuration, when the pair of clamp pieces 12 perform a closing operation while nipping the bone-in limb meat W in order to hold the bone-in limb W, the projection portion 16 protrudes toward the bone-in limb meat W and digs into the bone-in limb meat W, making it possible to fix the bone-in limb meat W so as to resist movement thereof. The projection portion 16 is disposed at a position deviated with respect to the pair of clamp pieces 12 in the direction perpendicular to the plane P, and thus fixes the bone-in limb meat W in cooperation with the pair of clamp pieces 12, allowing the clamping device 10 to stably fix the bone-in limb meat W.

It is possible to load the bone-in limb meat W to a processing portion such as a deboner in a desired direction by changing the pair of clamp pieces 12 to be at desired positions and orientations in a state in which the clamping device 10 holds the bone-in limb meat W. It is therefore possible to load the plurality of bone-in limb meats W to the processing portion in the same direction by sequentially holding the plurality of bone-in limb meats W by the clamping device 10.

Figure 2:
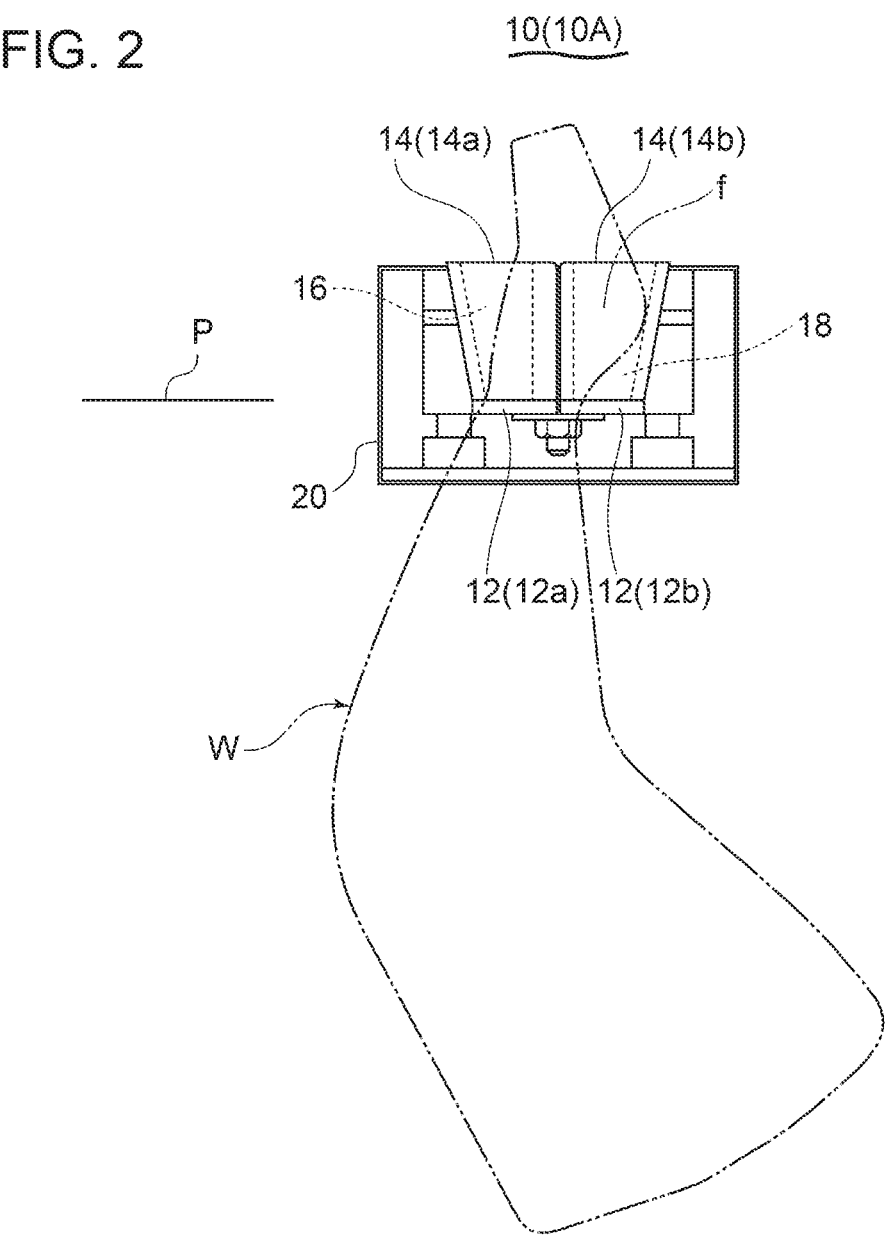
FIG. 2 is a front view of the clamping device according to an embodiment.

In an embodiment, as shown in FIG. 2, when the clamping device 10 holds the bone-in limb meat W, an enlarged diameter part f is suspended to the pair of clamp pieces 12. When the bone-in limb meat W is a bone-in thigh meat of poultry or the like, the enlarged diameter part f is a limb neck part. The pair of clamp pieces 12 rotate about shafts 23.

In an embodiment, as shown in FIG. 1, the clamping device 10 includes a base portion 20 to which the pair of clamp pieces 12 and the rotation suppressing portions 14 are attachable.

In an embodiment, the rotation suppressing portions 14 are mounted to the pair of clamp pieces 12.

In an embodiment, as shown in FIG. 1, an opening/closing driving portion 22 opening/closing the pair of clamp pieces 12 in the direction of the arrow "a" is disposed in base portion 20.

In an embodiment, the rotation suppressing portion 14 includes an abutting portion 18. The abutting portion 18 is disposed on the side of the second clamp piece 12 (12b) across a center line C between the pair of clamp pieces in the back of the pair of clamp pieces 12 with respect to the projection portion 16 and configured to contact the bone-in limb meat W when holding the bone-in limb meat W by the pair of clamp pieces 12.

The abutting portion 18 extends oblique to the direction perpendicular to the center line C between the pair of clamp pieces so as to head for the back of the pair of clamp pieces 12 as it approaches the first clamp piece 12 (12a).

According to the present embodiment, when the pair of clamp pieces 12 perform the closing operation while nipping the bone-in limb meat W, the abutting portion 18 presses the front surface of the bone-in limb meat W. Therefore, when the pair of clamp pieces 12 perform the closing operation, the projection portion 16 digs into the bone-in limb meat from the side of the first clamp piece, and the abutting portion 18 presses the bone-in limb meat from the side of the second clamp piece, making it possible to fix the bone-in limb meat more stably.

Figure 4:
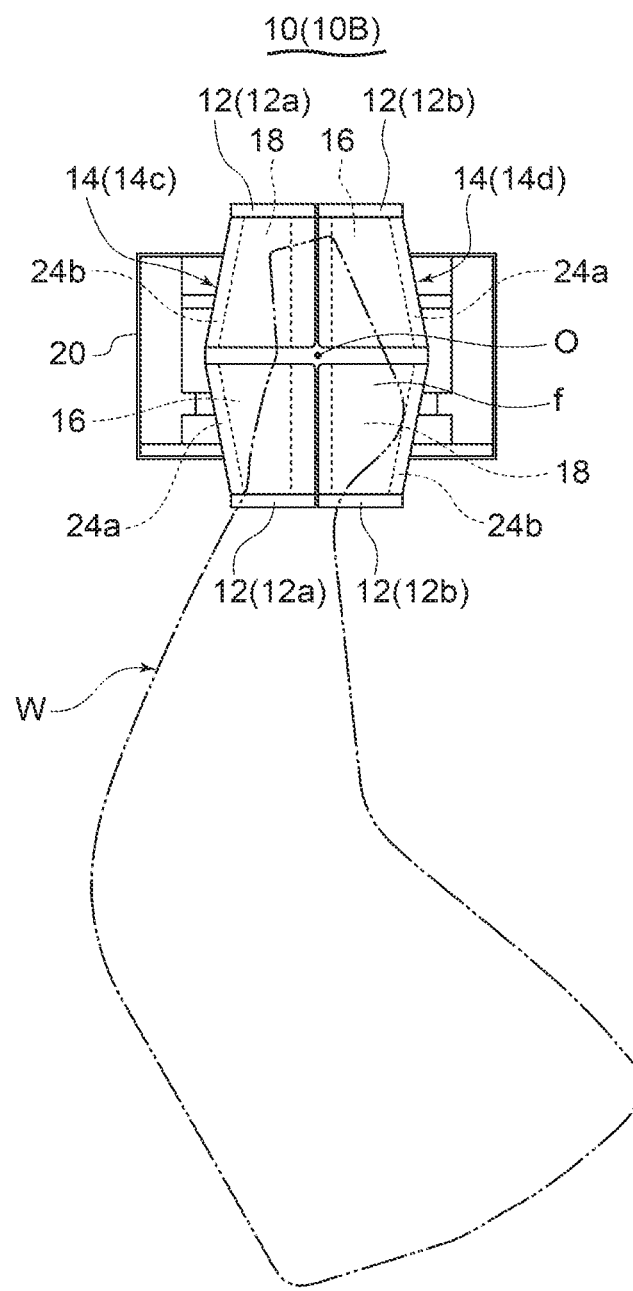
FIG. 4 is a front view of a clamping device according to an embodiment.

In an embodiment, as shown in FIGS. 2 and 4, the projection portion 16 is formed by a plate-shape body extending along a direction intersecting with the plane P.

According to the present embodiment, it is possible to increase a holding force of the projection portion 16 for the bone-in limb meat W by forming the projection portion 16 by the plate-shape body.

Figure 3:
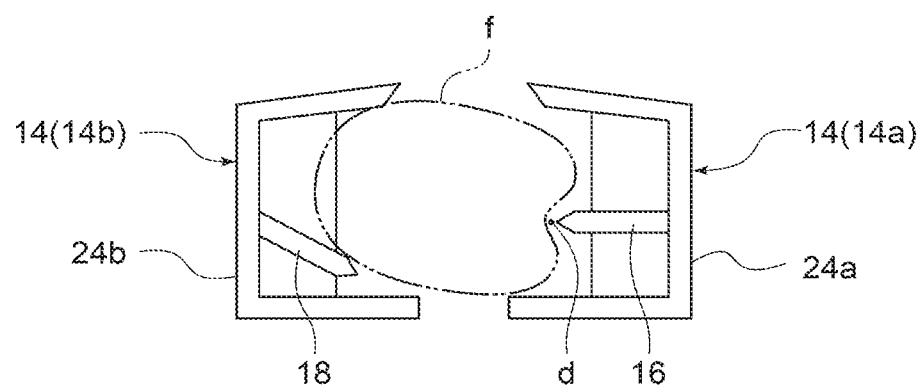
FIG. 3 is a back view of a part of the clamping device according to an embodiment.

Further, if the bone-in limb meat W is a bone-in thigh meat of poultry or the like, as shown in FIG. 3, the bone-in thigh meat has a depression d in the limb neck part as the enlarged diameter part f along a longitudinal direction. Therefore, when the projection portion 16 is the plate-shape body extending along the direction intersecting with the plane P, the projection portion 16 can be inserted along an extending direction of the depression d, making it possible to further improve the holding force for the bone-in limb meat.

In an embodiment, as shown in FIGS. 2 and 4, the abutting portion 18 is formed by a plate-shape body extending along the direction intersecting with the plane P.

According to the present embodiment, it is possible to increase an area where the abutting portion 18 contacts the bone-in limb meat W, making it possible to increase the holding force for the bone-in limb meat W.

In an embodiment, as shown in FIGS. 1 and 3, the rotation suppressing portions 14 include a first support wall 24a to which the projection portion 16 is fixed and a second support wall 24b to which the abutting portion 18 is fixed. The first support wall 24a and the second support wall 24b each extend along the direction intersecting with the plane P and, as shown in FIG. 2, each extend in a direction in which intervals between the first support wall 24a and the second support wall 24b are widened toward an upper side in a suspension direction of the bone-in limb meat W.

According to the present embodiment, the rotation suppressing portions 14 include the first support wall 24a and the second support wall 24b, making it possible to increase support strengths of the projection portion 16 and abutting portion 18, and to stably fix the bone-in limb meat W.

In addition, because the first support wall 24a and the second support wall 24b each extend in the direction in which the intervals between the first support wall 24a and the second support wall 24b are widened toward the upper side in the suspension direction of the bone-in limb meat, it becomes easier to accommodate, between the first support wall 24a and the second support wall 24b, the enlarged diameter part f located immediately above a held section of the bone-in limb meat and locked to the pair of clamp pieces 12, making it possible to stably suspend the bone-in limb meat by the pair of clamp pieces 12.

In an embodiment, as shown in FIGS. 1 and 3, the first support wall 24a and the second support wall 24b have U-shapes each having both ends bent in a direction to face each other when viewed from the direction perpendicular to the plane P.

According to the present embodiment, the first support wall 24a and the second support wall 24b have the U-shapes, making it possible to improve the strengths of the first support wall 24a and second support wall 24b.

In an embodiment, as shown in FIGS. 1 to 4, the first support wall 24a is integral with the first clamp piece 12 (12a) and disposed at a position deviated with respect to the first clamp piece 12 (12a) in the direction perpendicular to the plane P. The second support wall 24b is integral with the second clamp piece 12 (12b) and disposed at a position deviated with respect to the second clamp piece 12 (12b) in the direction perpendicular to the plane P.

According to the present embodiment, it is possible to dispose the projection portion 16 fixed to the first support wall 24a at a position where the projection portion 16 can fix the bone-in limb meat W in cooperation with the first clamp piece and to dispose the abutting portion 18 fixed to the second support wall 24b at a position where the abutting portion 18 can fix the bone-in limb meat W in cooperation with the second clamp piece. Thus it is possible to stably fix the bone-in limb meat.

In an embodiment, as shown in FIG. 1, the rotation suppressing portions 14 include a first rotation suppressing portion 14 (14a) and a second rotation suppressing portion 14 (14b). The first rotation suppressing portion 14 (14a) includes the first support wall 24a and the projection portion 16, and is fixed to the first clamp piece 12 (12a). The second rotation suppressing portion 14 (14b) includes the second support wall 24b and the abutting portion 18, and is fixed to the second clamp piece 12 (12b).

According to the present embodiments, the first rotation suppressing portion 14 (14a) and the second rotation suppressing portion 14 (14b) can move and perform an opening/closing operation together with an opening/closing operation of the first clamp piece 12 (12a) and second clamp piece 12 (12b), and hold the bone-in limb meat W together with the first clamp piece and the second clamp piece.

In an embodiment, in the clamping device 10 (10B) shown in FIG. 4, the pair of clamp pieces 12 and the rotation suppressing portions 14 are attachable to the base portion 20 so as to be invertible about the center line C. The pair of clamp pieces 12 and the rotation suppressing portions 14 are configured, by being inverted by 180°, such that the first clamp pieces 12 (12a) and the second clamp pieces 12 (12b), and the projection portions 16 and the abutting portions 18 can switch original positions with each other.

In an embodiment, the plurality of bone-in limb meats W are carried to the clamping device 10 by a conveyor or the like. In a case in which the bone-in limb meats are bone-in thigh meats, and the bone-in thigh meats are randomly placed on the conveyor, the upper surface of each bone-in thigh meat is one of a front surface (inner thigh surface) or a back surface (outer thigh surface). When the upper surface of the bone-in thigh meat is the front surface or the back surface on a holding surface where the bone-in thigh meat is placed, the position of the depression d in the enlarged diameter part f is reversed depending on whether the upper surface is the front surface or the back surface.

According to the present embodiment, even if the depression d is at the reverse position, it is possible to touch the depression d with the projection portion 16 by inverting the pair of clamp pieces 12 and the rotation suppressing portions 14.

In an embodiment, as shown in FIG. 4, a first rotation suppressing portion 14 (14c) and a second rotation suppressing portion 14 (14d) are formed integrally with the first support walls 24a including the projection portions 16 and the second support walls 24b including the abutting portions 18, respectively. The respective first clamp pieces 12 (12a) are disposed to the upper and lower ends of the first rotation suppressing portion 14 (14c), and the respective second clamp pieces 12 (12b) are disposed to the upper and lower ends of the second rotation suppressing portion 14 (14d).

The pair of clamp pieces 12 and the rotation suppressing portions 14 are configured to be inverted by 180° with respect to the base portion 20 with a center point O as a center, and are configured, by being inverted by 180°, such that the first clamp pieces 12 (12a) and the second clamp pieces 12 (12b), and the projection portions 16 and the abutting portions 18 can switch the original positions with each other.

The center point O is at a position overlapping the center line C when viewed form the direction perpendicular to the plane P, and is positioned on a boundary between the first support walls 24a and the second support walls 24b.

The first rotation suppressing portion 14 (14c) is fixed to the first clamp pieces 12 (12a), and the second rotation suppressing portion 14 (14d) is fixed to the second clamp pieces 12 (12b).

According to the present embodiment, the projection portion 16 of the first rotation suppressing portion 14 (14c) can be disposed, by being inverted by 180°, at a position where the projection portion 16 of the second rotation suppressing portion 14 (14d) has existed, and the abutting portion 18 of the first rotation suppressing portion 14 (14c) can be disposed, by being inverted by 180°, at a position where the abutting portion 18 of the second rotation suppressing portion 14 (14d) has existed.

Therefore, even if the depression d is at the reverse position on the front/back surface, it is possible to touch the depression d with the projection portions 16 by inverting the clamp pieces 12 and the rotation suppressing portions 14.

In an embodiment, the first support walls 24a and the second support walls 24b of the first rotation suppressing portion 14 (14c) and second rotation suppressing portion 14 (14d) each extend in a direction in which intervals between the first support walls 24a and the second support walls 24b are narrowed with distance from the center point O.

As shown in FIG. 4, the bone-in limb meat W is held in regions of the first support wall 24a and second support wall 24b of the first rotation suppressing portion 14 (14c) and second rotation suppressing portion 14 (14d), the regions being positioned on the lower side of the suspension direction of the bone-in limb meat W. The first support wall 24a and the second support wall 24b holding the bone-in limb meat W each extend in the direction in which the intervals between the first support wall 24a and the second support wall 24b are widened toward the upper side in the suspension direction of the bone-in limb meat W. Thus it becomes easier to accommodate the enlarged diameter part f between the first support wall 24a and the second support wall 24b, making it possible to stably suspend the bone-in limb meat.

Figure 5:
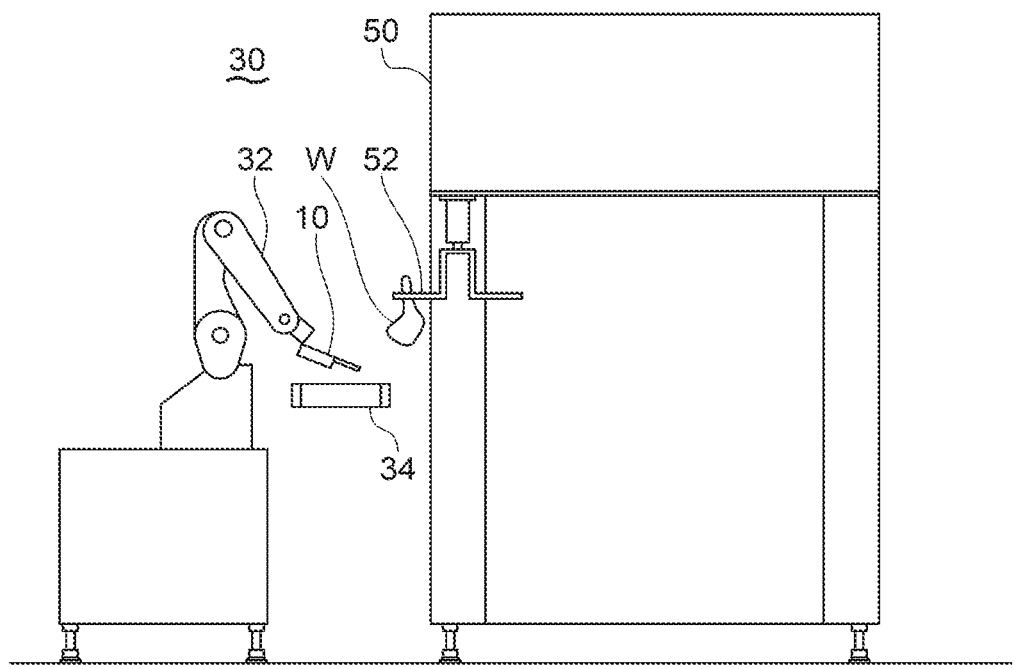
FIG. 5 is a front view of a loading device according to an embodiment.
Figure 6:
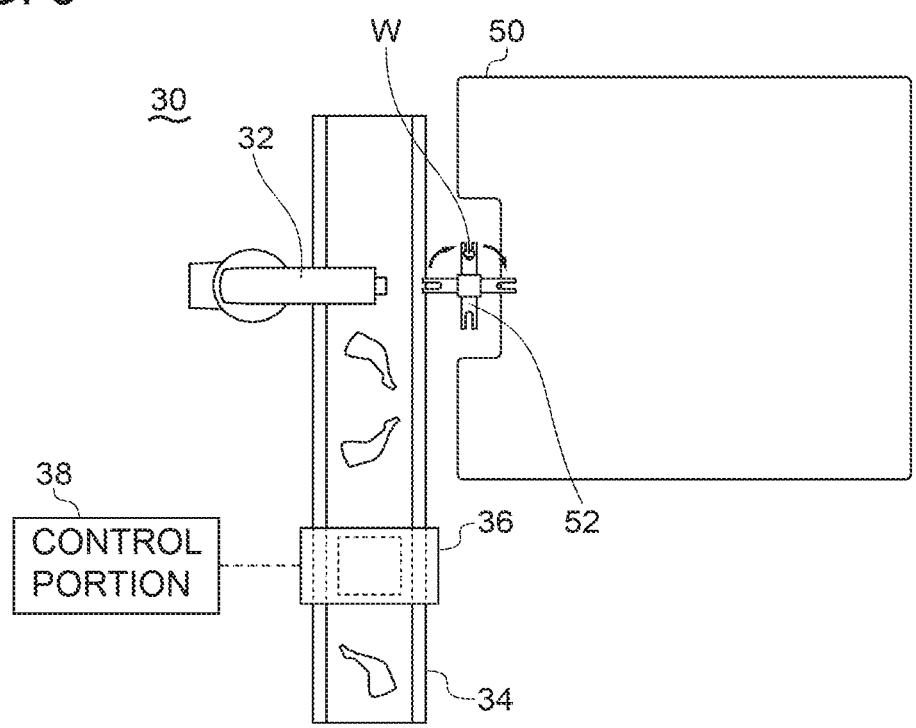
FIG. 6 is a planar view of the loading device according to an embodiment.

A loading device 30 for a bone-in limb meat according to an embodiment includes, as shown in FIGS. 5 and 6, the clamping device 10, and an arm 32 supporting the pair of clamp pieces 12 and capable of controlling the positions and orientations of the pair of clamp pieces 12. The bone-in limb meat W is held by the clamping device 10 and loaded to a processing portion 50 such as a deboner.

According to the above configuration, with the clamping device 10, it is possible to fix the bone-in limb meat W so as to resist movement thereof. Then, it is possible to change the pair of clamp pieces 12 to be at desired positions and orientations by the arm 32 while holding the bone-in limb meat by the clamping device 10, and thus to load the bone-in limb meat to the processing portion 50 in a desired direction. It is therefore possible to load the plurality of bone-in limb meats W to the processing portion or the like in the same direction by sequentially holding the bone-in limb meats by the clamping device 10.

In an embodiment, the arm 32 is formed as a multi-axes articulated arm, and can operate the base portion 20 at an arbitrary position and orientation.

In an embodiment, the processing portion 50 is a deboner which separates the bone-in limb meat W into a bone part and a meat part.

In an embodiment, as shown in FIGS. 5 and 6, the loading device 30 includes a conveyor 34 which conveys the bone-in limb meats W to the processing portion 50. The loading device 30 includes a determination portion 36 capable of acquiring orientation information of the bone-in limb meats W conveyed by the conveyor 34. A control portion 38 operates the arm 32 based on the orientation information obtained by the determination portion 36 and loads the bone-in limb meats W to the processing portion 50 in a predetermined direction.

According to the present embodiment, the control portion 38 operates the arm 32 based on the orientation information obtained by the determination portion 36, making it possible to hold the bone-in limb meats W placed and sent on the conveyor 34 at arbitrary positions and orientations, and sequentially hold the plurality of bone-in limb meats by the clamping device 10 and load the bone-in limb meats to the processing portion 50 in the same direction.

In an embodiment, the determination portion 36 includes an image capturing portion and an image processing portion. The image capturing portion captures images of the bone-in limb meats W on a conveyance surface of the conveyor 34, and the image processing portion obtains information about the positions and orientations of the bone-in limb meats W from the images of the bone-in limb meats W captured by the image capturing portion. The control portion 38 obtains the orientation information from the image processing portion.

Figure 7:
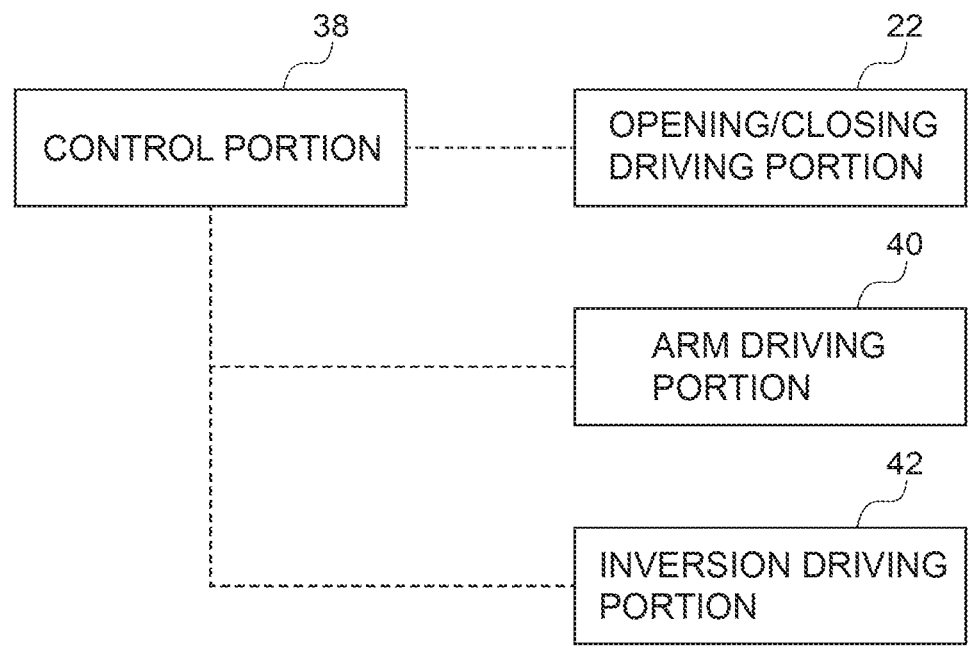
FIG. 7 is a block diagram of a control system of the loading device according to an embodiment.

In an embodiment, as shown in FIG. 7, an arm driving portion 40 for driving the arm 32, and an inversion driving portion 42 for inverting the pair of clamp pieces 12 and the rotation suppressing portions 14 by 180° are disposed. The control portion 38 controls an opening/closing driving portion 22 for opening/closing the pair of clamp pieces 12, the arm 32, and the inversion driving portion 42.

In an embodiment, the above orientation information includes front/back surface information indicating whether the upper surface of each bone-in limb meat W placed on the conveyor is a front surface or a back surface. The determination portion 36 obtains the front/back surface information. The control portion 38 controls the operation of the arm 32 based on the orientation information and the front/back surface information, and loads the bone-in limb meat W to the processing portion 50 so that one of the front surface or back surface always faces the same direction with respect to the processing portion 50.

According to the present embodiment, in a case in which the bone-in limb meat has the front surface or the back surface like a bone-in thigh meat, the control portion 38 controls the operation of the arm 32 based on the orientation information and the front/back surface information, making it possible to always load the bone-in limb meat to the processing portion 50 such as the deboner in the same direction regardless of whether the bone-in thigh meat has a right limb or a left limb, or the upper surface of the bone-in thigh meat is the front surface or the back surface on the conveyor when loading the bone-in limb meat to the processing portion 50.

When the processing portion 50 is a specialized machine only for the right limb or the left limb, the clamping device 10 is to hold one of the right limb or the left limb accordingly. In this case, it is possible to load, in the same direction, not only the bone-in thigh meat but also the front/back surface to the processing portion 50.

In an embodiment, as shown in FIGS. 5 and 6, the processing portion 50 includes a plurality of hangers 52 capable of suspending the bone-in limb meats W. The control portion 38 controls the operation of the arm 32 based on the orientation information and the front/back surface information, and loads the plurality of bone-in limb meats W to the plurality of hangers 42, respectively, so that one of the front surface or the back surface always faces the same direction.

According to the present embodiment, the control portion 38 controls the operation of the arm 32 based on the orientation information and the front/back surface information, making it possible to load the plurality of bone-in limb meats W to the plurality of hangers 52, respectively, so that one of the front surface or the back surface always faces the same direction. Thus it is possible to always load the plurality of bone-in limb meats to the processing portion 50 in the same direction.

A clamping method for a bone-in limb according to an embodiment is a method for holding the bone-in limb meat W by using the clamping device 10. As described above, the clamping device 10 includes the pair of clamp pieces 12 which are openable/closable so as to hold the bone-in limb meat W and rotation suppressing portions 14 disposed at positions deviated with respect to the pair of clamp pieces 12 in the direction perpendicular to the plane P.

Figure 8:
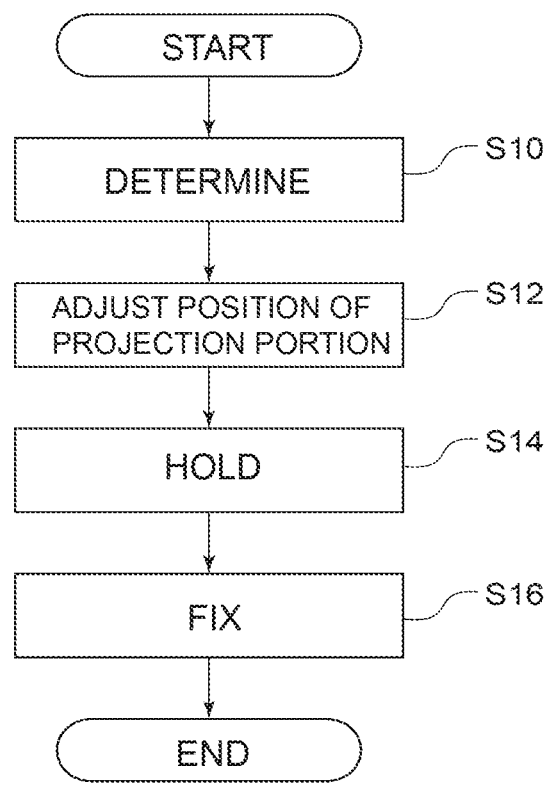
FIG. 8 is a flowchart of a clamping method according to an embodiment.

As shown in FIG. 8, basic steps of this clamping method include a holding step S14 of holding the bone-in limb meat W by closing the pair of clamp pieces 12 and a fixing step S16 of fixing the bone-in limb meat to the pair of clamp pieces 12 by inserting the projection portion 16 disposed on the rotation suppressing portion 14 into the depression d of the bone-in limb meat W as shown in FIG. 3.

According to the above method, in the holding step S14, when the pair of clamp pieces 12 perform the closing operation while nipping the bone-in limb meat W, the projection portion 16 protrudes toward the bone-in limb meat and digs into the bone-in limb meat, making it possible to fix the bone-in limb meat so as to resist movement thereof. The projection portion 16 is disposed at the position deviated with respect to the pair of clamp pieces 12 in the direction perpendicular to the plane P shown in FIG. 2, and thus fixes the bone-in limb meat in cooperation with the pair of clamp pieces 12, making it possible to stably fix the bone-in limb meat.

It is possible to load the bone-in limb meat to the processing portion 50 such as the deboner in a desired direction by changing the pair of clamp pieces 12 to be at desired positions and orientations in this state. It is therefore possible to load the plurality of bone-in limb meats to the processing portion 50 in the same direction by sequentially holding the plurality of bone-in limb meats by the clamping device 10.

In an embodiment, in a step before the holding step S14, the determination portion 36 determines whether the upper surface of the bone-in limb meat placed on the conveyor is the front surface or the back surface (determining step S10). The bone-in limb meat W is conveyed to the processing portion 50 by the conveyor 34. Subsequently, based on determination information obtained in the determining step S10, the position of the projection portion 16 with respect to the bone-in limb meat is adjusted so that the projection portion 16 is always inserted into the depression d (projection portion positioning step S12).

According to the present embodiment, based on the determination information obtained in the determining step S10, the projection portion 16 is always inserted into the depression d in the projection portion positioning step S12, making it possible to stably fix the bone-in limb meat.

In an embodiment, the bone-in limb meat W is the bone-in thigh meat, and the limb neck part as the enlarged diameter part f of the bone-in thigh meat is held by the pair of clamp pieces 12.

If the bone-in limb meat is the bone-in thigh meat, it is possible to stably fix the bone-in thigh meat by holding the limb neck part by the pair of clamp pieces 12 and to load the plurality of bone-in thigh meats to the processing portion 50 in the same direction by sequentially holding the plurality of bone-in thigh meats by the clamping device 10.

Industrial Applicability

According to an embodiment, it is possible to load a plurality of bone-in limb meats in the same direction without manpower when loading bone-in limb meats to a processing portion such as a deboner.

REFERENCE SIGNS LIST

10 (10A, 10B) Clamping device
12 A pair of clamp pieces
12 (12a) First clamp piece
12 (12b) Second clamp piece
14 Rotation suppressing portion
14 (14a, 14c) First rotation suppressing portion
14 (14b, 14d) Second rotation suppressing portion
16 Projection portion
18 Abutting portion
20 Base portion
22 Opening/closing driving portion
23 Shaft
24a First support wall
24b Second support wall
30 Loading device
32 Arm
34 Conveyor
36 Determination portion
38 Control portion
40 Arm driving portion
42 Inversion driving portion
50 Processing portion
52 Hanger
W Bone-in limb meat
C Center line
O Center point
d Depression
f Enlarged diameter part

The invention claimed is:

1. A clamping device for a bone-in limb meat comprising:
a pair of clamp pieces including a first clamp piece and a second clamp piece, and being openable/closable so as to hold a bone-in limb meat; and
rotation suppressing portions for suppressing a rotation of the bone-in limb meat, the rotation suppressing portions being disposed at positions deviated with respect to the pair of clamp pieces in a direction perpendicular to a plane including an opening/closing direction of the pair of clamp pieces,
wherein the rotation suppressing portions include a projection portion disposed so as to protrude from the first clamp piece into a space between the pair of clamp pieces and configured to contact the bone-in limb meat when viewed from the direction perpendicular to the plane.

2. The clamping device for the bone-in limb meat according to claim 1,
wherein the rotation suppressing portions further include an abutting portion disposed on a side of the second clamp piece across a center line between the pair of clamp pieces in back of the pair of clamp pieces with respect to the projection portion and configured to contact the bone-in limb meat, and
wherein the abutting portion extends oblique to a direction perpendicular to the center line between the pair of clamp pieces so as to head for the back of the pair of clamp pieces as the abutting portion approaches the first clamp piece.

3. The clamping device for the bone-in limb meat according to claim 1,
wherein the projection portion is formed by a plate-shape body extending along a direction intersecting with the plane.

4. The clamping device for the bone-in limb meat according to claim 2,
wherein the abutting portion is formed by a plate-shape body extending along a direction intersecting with the plane.

5. The clamping device for the bone-in limb meat according to claim 2,
wherein the rotation suppressing portions include:
a first support wall extending along the direction intersecting with the plane and including the projection portion fixed thereto; and
a second support wall extending along the direction intersecting with the plane and including the abutting portion fixed thereto, and
wherein the first support wall and the second support wall each extend in a direction in which intervals between the first support wall and the second support wall are widened toward the upper side in a suspension direction of the bone-in limb meat.

6. The clamping device for the bone-in limb meat according to claim 5,
wherein the first support wall and the second support wall have U-shapes each having both ends bent in a direction to face each other when viewed from the direction perpendicular to the plane.

7. The clamping device for the bone-in limb meat according to claim 5,
wherein the first support wall is integral with the first clamp piece and disposed at a position deviated with respect to the first clamp piece in the direction perpendicular to the plane, and
wherein the second support wall is integral with the second clamp piece and disposed at a position deviated with respect to the second clamp piece in the direction perpendicular to the plane.

8. The clamping device for the bone-in limb meat according to claim 1, further comprising the clamping device for the bone-in limb meat further includes a base portion to which the pair of clamp pieces and the rotation suppressing portions are attachable,
wherein the pair of clamp pieces and the rotation suppressing portions are attachable to the base portion so as to be invertible about the center line between the pair of clamp pieces.

9. A loading device for a bone-in limb meat for loading the bone-in limb meat to a processing portion, the loading device comprising:
the clamping device for the bone-in limb meat according to claim 1 and;
an arm supporting the pair of clamp pieces, and capable of controlling positions and orientations of the pair of clamp pieces,
wherein the bone-in limb meat held by the clamping device is loaded to the processing portion.

10. The loading device for the bone-in limb meat according to claim 9, further comprising:
a conveyor conveying the bone-in limb meat to the processing portion;
a determination portion capable of acquiring orientation information of the bone-in limb meat conveyed by the conveyor; and
a control portion operating the arm based on the orientation information obtained by the determination portion and loading the bone-in limb meat to the processing portion in a predetermined direction.

11. The loading device for the bone-in limb meat according to claim 10,
wherein the orientation information includes front/back surface information indicating whether an upper surface of the bone-in limb meat placed on the conveyor is a front surface or a back surface, and
wherein the control portion is configured to control an operation of the arm based on the orientation information and the front/back surface information, and load the bone-in limb meat to the processing portion so that one of the front surface or the back surface always faces a same direction with respect to the processing portion.

12. The loading device for the bone-in limb meat according to claim 11,
wherein the processing portion includes a plurality of hangers each being capable of suspending the bone-in limb meat, and
wherein the control portion is configured to control the operation of the arm based on the orientation information and the front/back surface information, and suspend the plurality of bone-in limb meats to the plurality of hangers respectively so that one of front surfaces or back surfaces always face a same direction.

13. A clamping method for holding a bone-in limb meat by using a clamping device which includes a pair of clamp pieces including a first clamp piece and a second clamp piece, and being openable/closable so as to hold the bone-in limb meat, and rotation suppressing portions for suppressing a rotation of the bone-in limb meat, the rotation suppressing portions being disposed at positions deviated with respect to the pair of clamp pieces in a direction perpendicular to a plane including an opening/closing direction of the pair of clamp pieces, the rotation suppressing portions including a projection portion disposed so as to protrude from the first clamp piece into a space between the pair of clamp pieces and configured to contact the bone-in limb meat when viewed from the direction perpendicular to the plane, the clamping method comprising:
a holding step of holding the bone-in limb meat by closing the pair of clamp pieces; and
a fixing step of fixing the bone-in limb meat to the pair of clamp pieces by inserting the projection portion into a depression of the bone-in limb meat.

14. The clamping method for the bone-in limb meat according to claim 13, further comprising:
a determining step of determining whether a surface of the bone-in limb meat placed on a conveyor is a front surface or a back surface, the bone-in limb meat being conveyed to the processing portion by the conveyor; and
an adjusting step of adjusting, based on determination information obtained in the determining step, a position of the projection portion with respect to the bone-in limb meat so that the projection portion is always inserted into the depression.

15. The clamping method for the bone-in limb meat according to claim 13,
wherein the bone-in limb meat is a bone-in thigh meat, and
wherein a limb neck part of the bone-in thigh meat is held by the pair of clamp pieces.

* * * * *